Patented Apr. 24, 1951

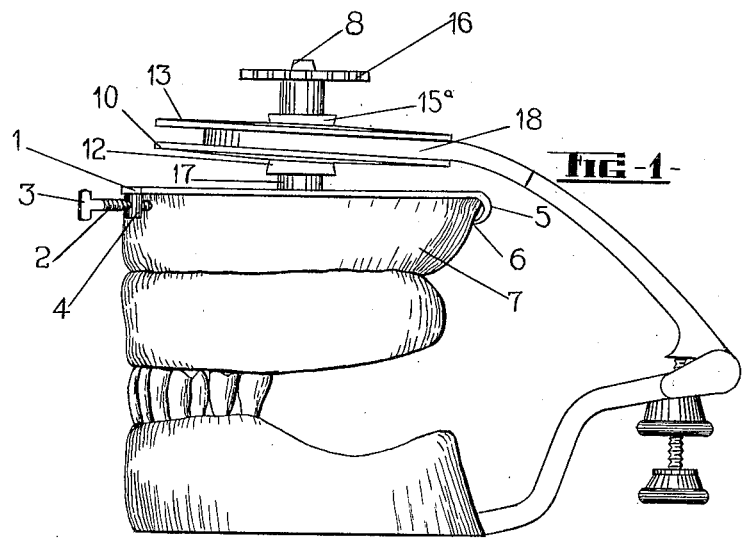
FIG-1-
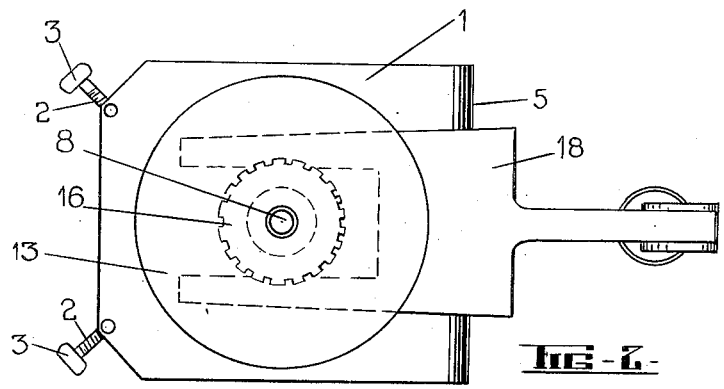
FIG-2-
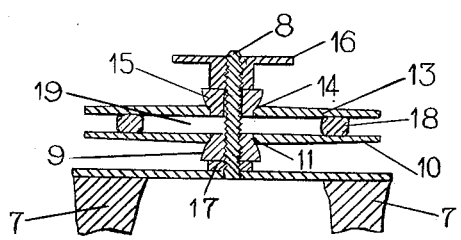
FIG-3-

2,550,043

UNITED STATES PATENT OFFICE 2,550,043

LOCKING UNIVERSAL JOINT FOR USE WITH DENTAL ARTICULATORS AND THE LIKE

Walter de Lautour, Gisborne, New Zealand

Application February 8, 1946, Serial No. 646,356
In New Zealand November 8, 1945

3 Claims. (Cl. 32—32)

This invention relates to locking universal joints for use with dental articulators and the like and more particularly for use with jaws of articulators which hold bite blocks, dental models or the like.

The object of the invention is to provide a locking universal joint for use with dental articulators or the like wherein a holder for a bite block is adjustable easily and quickly as required in making dental plates, that is adjustable to varying sizes of bite blocks and to hold the latter, and a locking universal joint which can be adjusted within its limits to infinite variations easily and quickly in order to correct any error, however small, in the articulation or bite, while trying in, before completing a denture. A further object is to save labour and material in preparing dental plates by eliminating steps in the usual method of making dental plates and in so doing reduce the wastage of material hitherto used in the preparation of dental plates.

According to this invention a locking universal joint for use with a dental articulator having a supporting jaw or the like and a holder for a bite block comprises a holder for a bite block having means for retaining a bite block when adjusted to its size, and a universal jointing means capable of attaching the holder to a supporting jaw or the like of a dental articulator, said latter means being adjustable to infinite degrees within its limits to gain desired adjustment between the holder and the supporting jaw.

The invention will now be further described with reference to the accompanying drawings in which:

Figure 1 is a side elevational view of an articulator supporting two locking universal joints.

Figure 2 is a plan view of Figure 1 while

Figure 3 is an elevational front view in cross section on line A—A of Figure 1.

With reference to the drawings the holder comprises a platform 1 having, on its under surface at one side, adjustable screw bolts 2 with finger grips 3, screw threaded through studs or posts 4 affixed to the platform 1, while an opposite side of the platform 1 has a stop 5 which may be a turned up or a turned down side of the platform 1 with a turned in and serrated edge 6. Thus a bite block 7, see Figure 1, can be placed on the platform 1 and retained thereon between the inner ends of the screw bolts 2 projecting through the studs, posts or the like 4 and adjusted to the size of the bite block 7, and the serrated edge 6 of the stop 5.

The universal jointing means comprises a stem 8 fixed preferably centrally on the upperside of the platform 1 of the holder, a bevelled or cone-shaped collar 9 fixed on the stem 8, a clamping plate 10 about the stem 8 and having an orifice 11 to fit the bevelled or cone-shaped surface of the collar 9, a second clamping plate 13 about the stem 8 and having an orifice 14, a bevelled or cone-shaped collar 15 loose on the stem 8 and fitting into the orifice 14 of the clamping plate 13, and a knurled or winged nut 16 screw threaded on the free end of the stem 8. The collar 9 is fixed preferably to the stem 8 at a distance (indicated at 17) along the stem 8 away from the upper surface of the platform 1 to allow for freedom of movement of the clamping plate 10 so that in adjusting the platform 1, the latter is not blocked by the plate 10.

The clamping plates 10 and 13 are bored with their respective orifices 11 and 14 receiving, in one case, the bevelled or cone-shaped surface 12 of the collar 9 and, in the other case, the bevelled or cone-shaped surface 15a of the collar 15. Further the clamping plates 10 and 13 are circular and of lesser diameter than the width of the platform 1, and the outer surfaces of the clamping plates 10 and 13, as illustrated in Figures 1 and 3 of the drawings, are bevelled radially outwardly from their orifices 11 and 14 to their peripheries, in the form of low domes. Thus, the clamping plates 10 and 13 are interchangeable and the bevelled outer surfaces of the clamping plates 10 and 13 ensure the locking of the joint without blocking the platform 1 when the clamping plates 10 and 13 are applied to varying thicknesses or sizes of supporting jaws or arms 18. Also the opposed surfaces of the clamping plates 10 and 13 may be roughened or otherwise shaped to assist in clamping the supporting jaw 18 or the like therebetween.

In carrying out the invention, a bite block, model or the like 7 is placed on the platform 1, the screw bolts 2 are manipulated and adjusted according to the size of the bite block, model or the like 7, and the screw bolts 2 are screwed in to engage with and hold the bite block, model or the like 7 on the platform 1 against the latter's serrated edge 6.

The universal jointing and locking means is then placed on the support, such as a jaw or bifurcated arm 18 of an articulator, with the jaw or arm 18 between the clamping plates 10 and 13, and the stem 8 is passed through a hole, slot or opening 19 in the supporting jaw or arm 18 with the latter between the clamping plates 10 and 13. The hole, slot or opening 19 in the supporting jaw or arm 18 has ample room and play to allow the stem 8 to be slipped or positioned without the stem 8 binding on the supporting jaw or arm 18. Thus, by adjusting the stem 8 and the plates 10 and 13 on the supporting jaw or arm 18 and with the orifices 11 and 14 of the clamping plates 10 and 13 adjustable on and over the bevelled or cone-shaped surfaces 12 and 15a of the collars 9 and 15, any desired adjustment of the holder platform 1 in relation to the supporting jaw or arm 18 can be made within the limits of the universality of the joint. On making the desired adjustment as aforesaid, the nut 16 is set up on the stem 8 and bears against the collar 15 to draw the latter, and the clamping plates 10, and 13 together against the collar 9 on the stem 8 to bind the clamping plates 10, 13, to the supporting jaw or arm 18 held therebetween and to lock the joint in the desired position as may be required. By loosening the nut 16 on the stem 8 a new adjustment may be made and the joint locked again in the new position by tightening up the nut 16 as aforesaid. Thus as used in connection with articulators an adjustment and, if necessary, a new adjustment can be made between bite blocks and upper and lower teeth of a denture to position the latter accurately and correctly.

While this invention has been described and particularized with reference to dentistry and more particularly to articulators used in dental work and in making dentures, the invention can be applied and adapted to other purposes where adjustment is desired between a holding means and a supporting means by a universal joint that can be locked in a desired position when desired adjustment and positioning has been made.

What I do claim and desire to obtain by Letters Patent of the United States of America is:

1. In a device for mounting a holder for a bite block in a dental articulator, the combination of a jaw having two branches mounted on the articulator; a stem mounted on the holder and loosely embraced by said jaw; a collar fixed on said stem and having a conical surface; a plate having a central conical passage in which said surface is disposed; a second collar loose on said stem and having a conical surface; a second plate having a central conical passage in which said second surface is disposed; and a jam nut threaded on said stem for engagement against said second collar when set up on said stem, said plates being adapted to grip the branches of the jaw disposed therebetween when the nut is so set up.

2. In a device for mounting a holder for a bite block in a dental articulator; the combination of a jaw having two branches mounted on the articulator, a stem mounted on the holder and loosely embraced by said jaw; said stem having a jam nut threaded thereon, a pair of plates, each having a central conical passage; a collar fixed on said stem adjacent the holder, the said collar having a conical surface; a second collar loose on said stem and engaged by the jam nut, said second collar having a conical surface and each of said conical surfaces engaging the wall of a central conical passage of a plate so that each of said plates is movable about its collar to adjust a bite block, said jam nut being capable of being set up on the stem to retain an adjustment of the bite block by the plates gripping the branches of the jaw disposed therebetween.

3. A device for mounting a holder for a bite block in a dental articulator, the combination of a jaw having two branches mounted on the articulator; a stem mounted on the holder and loosely embraced by said jaw; a jam nut threaded on said stem; a pair of plates each circular in construction, and each having a flat surface and a surface tapering towards the periphery of the plate and each having a flat surface of the plates opposed to each other and each having a central conical passage made therein; a spacer fixed on the stem adjacent the holder; a collar fixed on said stem adjacent the spacer; the said collar having a conical surface; a second collar loose on said stem and engaged by the jam nut, said second collar having a conical surface, and each of said conical surfaces engaging the wall of a central conical passage of a plate so that each of said plates is movable about its collar without the periphery of the plate on the fixed collar contacting the holder to adjust a bite block, said jam nut being capable of being set up on the stem to retain an adjustment of the bite block by the plates gripping the branches of the jaw disposed therebetween.

WALTER de LAUTOUR.

REFERENCES CITED

The following references are of record in the file of this patent:

UNITED STATES PATENTS

| Number | Name | Date |
|---|---|---|
| 537,812 | Bragg | April 23, 1895 |
| 981,430 | Kennedy | Jan. 10, 1911 |

FOREIGN PATENTS

| Number | Country | Date |
|---|---|---|
| 172,225 | Great Britain | Dec. 8, 1921 |